3,671,083
BRAKE PRESSURE CONTROL SYSTEM
Yoshihiro Matsumura, Yokosuka, Japan, assignor to Nippon Air Brake Company, Ltd., Fukiai-ku, Kobe, Japan
Filed Apr. 13, 1970, Ser. No. 27,898
Claims priority, application Japan, Apr. 21, 1969, 44/30,231
Int. Cl. B60t 8/08, 8/12
U.S. Cl. 303—21 BE
4 Claims

ABSTRACT OF THE DISCLOSURE

A brake pressure control system for a vehicle in which the deceleration detected by a sensor is compared with a reference deceleration for the on-off control of brake pressure. In the system, an additional on-off signal line is provided so as to eliminate undesirable locking of the wheels which is encountered inevitably with the conventional means for the on-off control of brake pressure.

BACKGROUND OF THE INVENTION

Field of the invention

This invention relates to brake pressure control systems and more particularly to improvements in electronic means or a so-called computer in an anti-skid brake system for a vehicle, which detects the deceleration of the wheel and controls the brake pressure depending on the deceleration so detected.

Description of the prior art

In conventional brake pressure control systems of this kind in which the brake action is applied depending on the coefficient of friction $\mu$ between the wheel and the road surface, the operation of the computer for controlling the brake pressure has been such that it detects the deceleration of the wheel at the time of brake application and compares the deceleration so detected with a reference deceleration to obtain a signal for releasing the brake pressure (or turning on the control) or a signal for applying the brake pressure (or turning off the control) so as thereby to limit the slip ratio of the wheel to a range of from 0.1 to 0.4.

However, when the coefficient of friction $\mu$ is quite low or varies abruptly depending on the state of the road surface, such a computer of the conventional type cannot distinguish whether the brake is excessively applied to an extent that the wheels are completely locked to develop a state of complete skidding or the wheels are rotating at a constant speed. This is because the deceleration is zero in both these cases. In the former case, the state of complete skidding persists and the anti-skid effect cannot be accomplished unless the brake pressure is released. In the latter case, release of the brake pressure would give rise to an adverse effect. The prior art computer which cannot distinguish between these two states has thus been defective in that the wheels are kept in the locked state.

SUMMARY OF THE INVENTION

It is therefore an object of the present invention to provide a novel and improved brake pressure control system which obviates the prior defects described above.

In accordance with the present invention, there is provided a brake pressure control system for a vehicle including a sensor for detecting the rotating speed of the wheel for generating an electrical signal $E_2$ representative of the rotating speed of the wheel, a deceleration detector for converting the electrical signal $E_2$ delivered from said sensor to obtain a voltage corresponding to the deceleration, a reference deceleration voltage generator for generating a voltage corresponding to a reference deceleration, a first comparator for comparing these two voltages with each other to obtain a first on-off control signal, and a computing means, said system comprising a pattern generator in the form of an RC delay circuit for converting the electrical signal $E_2$ delivered from said sensor into a pattern voltage $E_1$, and a second comparator for comparing the pattern voltage $E_1$ with the electrical signal $E_2$ to obtain a second on-off control signal, said first and second on-off control signals being applied to said computing means to obtain a command signal.

Other objects, features and advantages of the present invention will be apparent from the following detailed description of a preferred embodiment thereof taken in conjunction with the accompanying drawings.

DESCRIPTION OF THE PREFERRED EMBODIMENT

Figure 1:
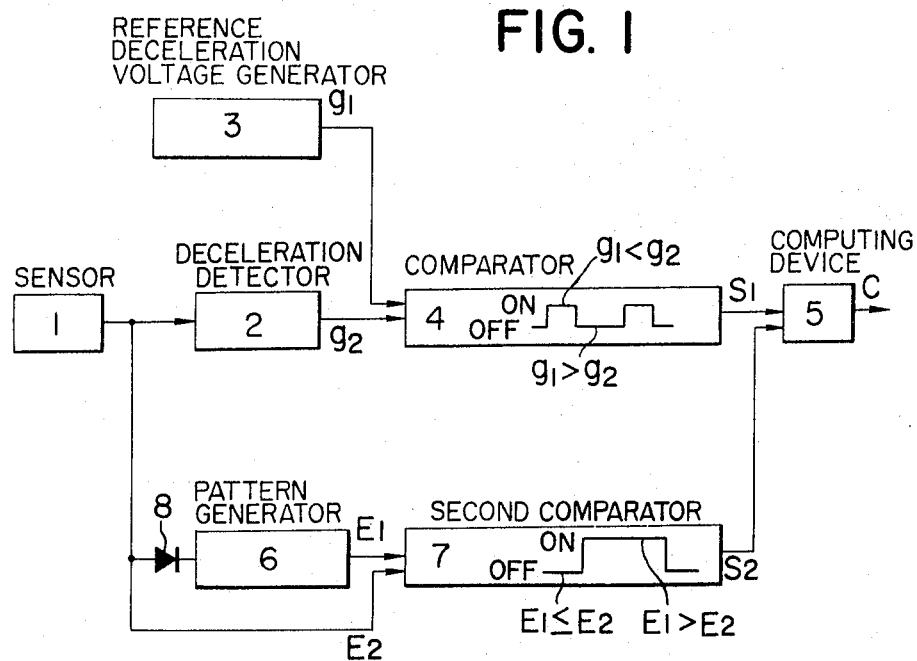
FIG. 1 is a block diagram of a brake pressure control system according to the present invention.

Referring to FIG. 1, a sensor 1 detects the rotating speed of the wheel of a vehicle and delivers an electrical $E_2$ representative of the rotating speed of the wheel. The electrical signal $E_2$ is applied to a deceleration detector 2 which is composed essentially of a differentiator and a timing circuit so that a voltage signal $g_2$ representative of the deceleration appears at the output of the deceleration detector 2. A reference deceleration voltage generator 3 disposed separately from the deceleration detector 2 delivers a reference deceleration voltage signal $g_1$ which is representative of a reference or desired deceleration of the wheel. These two voltage signals $g_1$ and $g_2$ are applied to a comparator 4 which may, for example, be a differential amplifier so that, when $g_1 < g_2$, a signal $S_1$ for turning on the control is delivered from the comparator 4 and applied to a computing device 5 to derive a command signal C for releasing the hydraulic pressure in the anti-skid brake mechanism. When, on the other hand, $g_1 > g_2$, a signal $S_1$ for turning off the control is delivered from the comparator 4 and applied to the computing device 5 to derive a command signal C for increasing the hydraulic pressure in the anti-skid brake mechanism again. The structure and function of these components of the system for obtaining the command signal C are similar to those of the prior art system.

Figure 2:
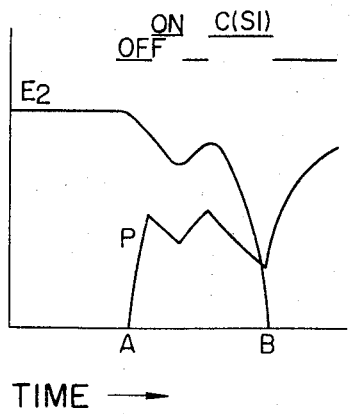
FIG. 2 is a graph showing variation in the brake pressure and wheel speed relative to an on-off command signal in a prior art brake pressure control system of this kind.

Referring to FIG. 2, the on-off state of the command signal C which in this case is the same as the output signal $S_1$ from the comparator 4 is shown in the upper part of the graph. In FIG. 2, $E_2$ and P represent the rotating speed of the wheel and the hydraulic pressure at the wheel cylinder, respectively. Actuation of the brake at time A causes an abrupt rise in the hydraulic pressure P at the wheel cylinder. As the hydraulic pressure P increases, the braking effect is developed with the result that the rotating speed $E_2$ of the wheel starts to decrease. In this state, the command signal C or $S_1$ for controlling the anti-skid brake mechanism is in its off state, but in a short length of time, the command signal C for turning on the control is given by the operation of the circuit to alleviate the hydraulic pressure P. Subsequently, the command signal C for turning off the control is given again to increase the hydraulic pressure P. The above cycle is repeated to carry out the normal operation of the brake pressure control system.

In this connection, it will be noted that zero wheel speed will appear at point B when the coefficient of friction $\mu$ is quite low or makes an abrupt change as referred to hereinbefore. In FIG. 2, it is assumed that this phenomenon appears while the command signal C is on or during the reduction of the hydraulic pressure P. In this condition, the deceleration $g_2$ is zero and is necessarily less than the reference deceleration $g_1$ with the result that the command signal C for turning off the control is given to cause an abrupt increase in the hydraulic pressure P. Thus, the wheels are completely locked against rotation thereafter and the anti-skid effect cannot be expected any more. When, on the other hand, the above phenomenon appears while the command signal C is off, a further greater degree of skidding would continuously persist after the point B.

Figure 3:
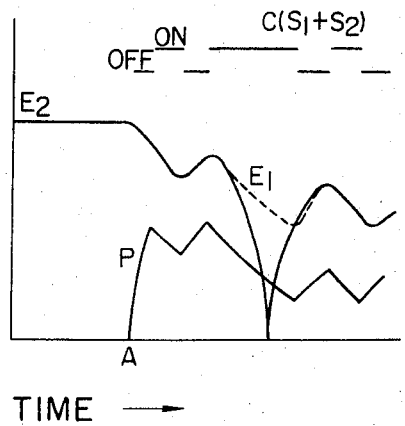
FIG. 3 is a graph similar to FIG. 2, but showing variations in the brake pressure and wheel speed relative to an on-off command signal in the brake pressure control system according to the present invention.

The above defect is obviated by the present invention. Referring to FIG. 1 again, the output $E_2$ from the sensor 1 is applied to a pattern generator 6 through a diode 8 which blocks the flow of current in the reserve direction. The pattern generator 6 which may, for example, be in the form of an RC delay circuit acts to delay an abrupt decrease of the voltage $E_2$ thereby to deliver an output $E_1$ which is represented by a dotted curve giving an approximate wheel speed pattern as shown in FIG. 3. The voltage $E_2$ referred to previously and this pattern voltage $E_1$ are applied to a second comparator 7 which may be a differential amplifier for the sake of comparison between these two voltages. When $E_1 \leq E_2$, a control signal $S_2$ for turning off the control is delivered from the comparator 7, while when $E_1 > E_2$, a control signal $S_2$ for turning on the control is delivered from the comparator 7.

The control signal $S_2$ is applied together with the previously described control signal $S_1$ to the computing device 5 which carries out computation as shown in Table 1 to deliver a command signal C.

TABLE 1

| $S_1$ | $S_2$ | C |
|---|---|---|
| ON | ON | ON. |
| ON | OFF | ON. |
| OFF | ON | ON. |
| OFF | OFF | OFF. |

As will be easily understood from comparison between FIG. 3 and FIG. 2, the command signal C is kept in the off state due to the presence of the pattern voltage $E_1$ in spite of the tendency toward locking of the wheels and then the normal state of on-off control is restored.

It will be appreciated from the foregoing description that the present invention provides a novel and improved brake pressure control system for controlling the rotation of the wheels by controlling the deceleration of the wheels in which means for generating an approximate wheel speed pattern are provided to distinguish whether the wheels are making constant rotation or the wheels are actually locked against rotation in the case in which the coefficient of friction $\mu$ is quite low or makes an abrupt change, thereby completely avoiding the undesirable skidding.

While a preferred embodiment of the present invention has been described by way of example, it will be apparent to those skilled in the art that the present invention is in no way limited to such a specific embodiment and many changes and modifications may be made therein without departing from the scope of the appended claims.

I claim:

1. A brake pressure control system for a vehicle comprising a sensor for generating an electrical signal voltage $E_2$ representative of the rotating speed of a wheel of the vehicle, a deceleration detector for converting the electrical signal voltage $E_2$ delivered from said sensor to provide a voltage corresponding to the deceleration of the said wheel, a reference deceleration voltage generator for generating a voltage corresponding to a reference deceleration, a first comparator for comparing these two voltages with each other to obtain a first on-off control signal for controlling the brake pressure, said first comparator providing an off control signal when said voltage corresponding to said reference deceleration is greater than said voltage corresponding to the deceleration of said wheel and an on control signal when said voltage corresponding to said reference deceleration is less than said voltage corresponding to the deceleration of said wheel, a pattern generator comprising an RC delay circuit receiving said voltage $E_2$ from said sensor, said pattern generator converting the voltage $E_2$ delivered from said sensor into a pattern voltage $E_1$, a second comparator for comparing the pattern voltage $E_1$ with the voltage $E_2$ to obtain a second on-off control signal for controlling the brake pressure, said second comparator providing an off control signal when said pattern voltage $E_1$ is equal to or less than said voltage signal $E_2$ and providing an on control signal when said pattern voltage $E_1$ is greater than said signal $E_2$, and a computing device responsive to the control signals from both of said comparators and adapted to provide an off command signal only when both comparators are delivering an off control signal and an on command signal when either or both comparators are delivering an on control signal, whereby to eliminate undesirable locking of wheels which could occur with the mere application of said first on-off control signal.

2. A brake pressure control system for a vehicle as claimed in claim 1, in which the electrical signal voltage $E_2$ delivered from said wheel speed sensing means is applied to said pattern voltage generating means through a diode.

3. A brake pressure control system for a vehicle as claimed in claim 2 in which the first comparator is a differential amplifier.

4. A brake pressure control system for a vehicle as claimed in claim 3, in which the second comparator is a differential amplifier.

References Cited

UNITED STATES PATENTS

| 3,482,887 | 12/1969 | Sheppard | 303—21 BE |
| 3,245,213 | 4/1966 | Thompson et al. | 303—21 EB |
| 3,494,671 | 2/1970 | Slavin et al. | 303—21 P |

FOREIGN PATENTS

| 1,953,253 | 10/1969 | Germany | 303—21 P |

MILTON BUCHLER, Primary Examiner

S. G. KUNIN, Assistant Examiner

U.S. Cl. X.R.

303—20